United States Patent [19]

Gazuit

[11] 4,045,150

[45] Aug. 30, 1977

[54] TIRE UPPER-BEAD POSITIONING DEVICE FOR USE IN A CURING PRESS

[75] Inventor: Georges Gazuit, Montlucon, France

[73] Assignee: Zelant, Gazuit, Montlucon, France

[21] Appl. No.: 736,311

[22] Filed: Oct. 28, 1976

[30] Foreign Application Priority Data

Oct. 29, 1975   France .................................. 75.33047

[51] Int. Cl.² .............................................. B29H 5/02
[52] U.S. Cl. ........................................ 425/58; 425/36; 425/38; 425/33
[58] Field of Search .................... 425/28 R, 33, 36, 38, 425/48, 58; 294/88

[56] References Cited

U.S. PATENT DOCUMENTS

| | | | |
|---|---|---|---|
| 2,997,738 | 8/1961 | Soderquist | 425/38 X |
| 3,097,394 | 7/1963 | Mallory et al. | 425/38 X |
| 3,260,782 | 7/1966 | Soderquist | 425/38 X |
| 3,378,882 | 4/1968 | Turk et al. | 425/38 |
| 3,520,024 | 7/1970 | Caretta et al. | 425/38 |
| 3,584,335 | 6/1971 | Ulm et al. | 425/36 |
| 3,809,423 | 5/1974 | Gaquist | 425/38 X |
| 3,846,058 | 11/1974 | Yoshida et al. | 425/38 |
| 3,988,077 | 10/1976 | Naratov et al. | 425/38 |

Primary Examiner—J. Howard Flint, Jr.
Attorney, Agent, or Firm—Amster & Rothstein

[57] ABSTRACT

Device for centering and positioning the upper bead of a horizontally disposed crude tire around a bead ring provided centrally of the upper, vertically movable portion of the mold in a vulcanizing press of the type comprising a set of radial segments disposed in a central cavity in the upper mold portion, said segments having their operative ends shaped to constitute together a tapered centering member; a vulcanizing bladder is firstly inflated moderately in order to push said upper bead against said tapered centering member, whereafter said segments are allowed to retract radially and rise in said cavity under the bladder pressure until the upper bead is force fitted around the bead ring.

6 Claims, 6 Drawing Figures

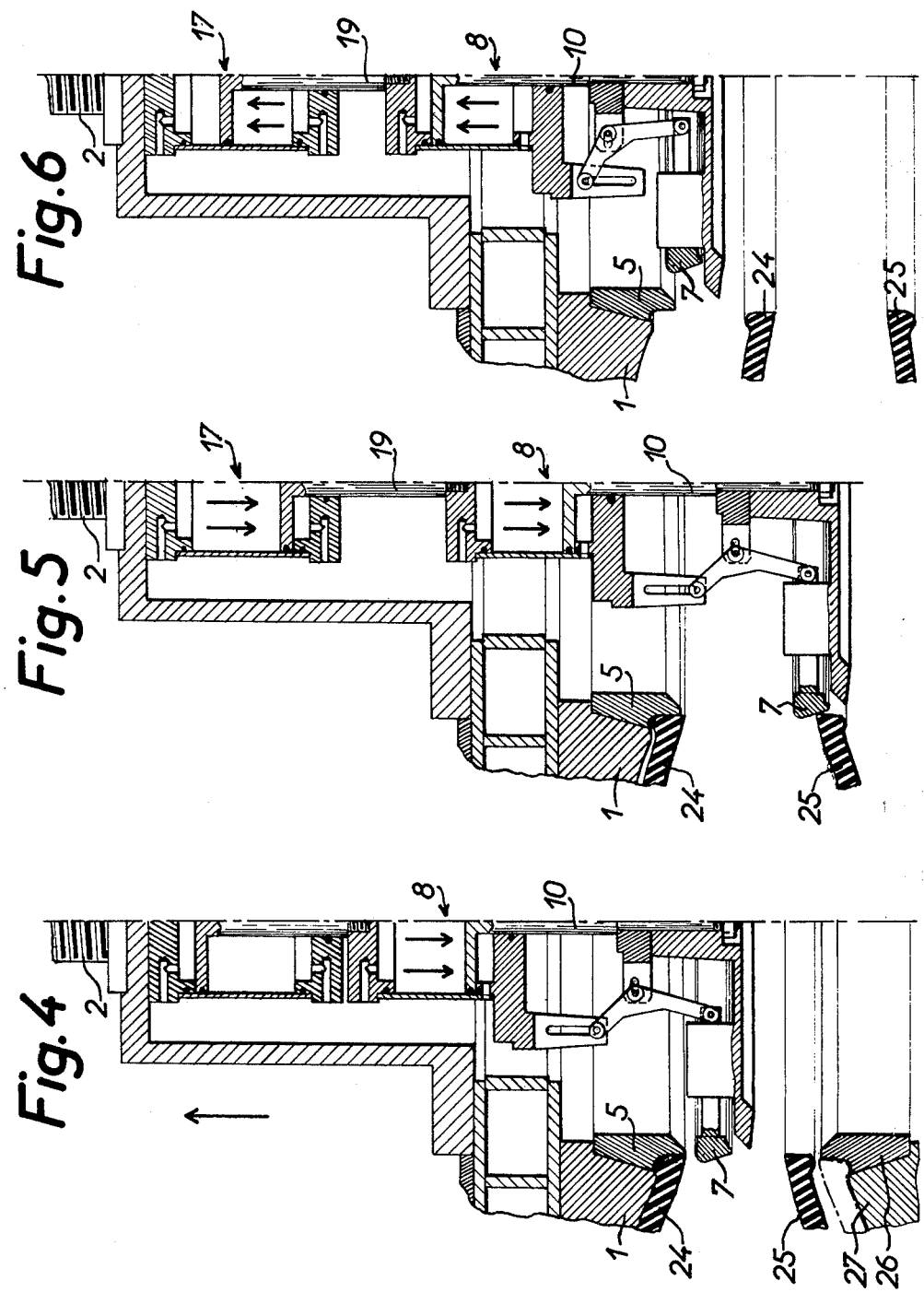

TIRE UPPER-BEAD POSITIONING DEVICE FOR USE IN A CURING PRESS

BACKGROUND OF THE INVENTION:

1. Field of the Invention

The present invention relates to a device for centering and positioning the upper bead of a crude tire disposed horizontally around a bead ring provided centrally of the upper, vertically movable portion of the mold of a tire curing press.

The fundamental requirement to be met when it is desired to obtain a tire preserving a strict geometrical shape during the curing operation, and having faultless beads, is to properly position said beads around bead rings provided in the upper and lower portions of the curing press mold, respectively, before closing the mould and performing the curing operation proper.

2. Description of the Prior At

The Applicant has already disclosed in a prior U.S. Pat. No. 3,809,423 an automatic loader for tire curing or vulcanizing presses which, in addition to its specific function of loading crude tires into the press mould, is also designed for positively centering and positioning the lower bead of the crude tire around the bead ring disposed in the lower portion of the press mould.

On the other hand, the Applicant also disclosed in a prior British patent No. 1,368,362 a tire curing press of the type comprising a segment assembly disposed in a cavity centrally of the upper portion of the mold, each segment being movable both vertically and radially under the control of a fluid-actuated cylinder or actuator common to all the segments, and an inflatable vulcanizing bladder located centrally of the lower fixed mold portion. In this press the bead ring disposed centrally of the upper portion of the mould is not fastened to said upper portion but adapted to be moved vertically by means of another actuator simultaneously with the first actuator and said segment assembly. Moreover, the ends of said segments are substantially wedge-shaped so that they can catch from underneath the upper head of the tyre and force fit said bead around the bead ring when said segments are spread radially outwards, as explained in the above-mentioned British Patent No. 1,368,362. However, with this arrangement the segments cannot properly grip the upper bead of the crude tire unless said bead is perfectly centred in relation to the vertical axis of symmetry of the upper mold portion, and said bead lies in a horizontal or substantially horizontal plane. Now crude tires are relatively soft and prone to undergo a distortion when stored. As a result, when a crude tire is laid upon the lower portion of a vulcanizing press its upper bead is generally out of center with respect to the vertical axis of symmetry of the upper portion of the mold, and it lies in most instances in a plane more or less inclined to the horizontal. Therefore, in the above-described arrangement the radially movable segments are not capable of properly positioning the top bead of the crude tire around the bead ring, and in many cases they are definitely precluded from gripping the bead before positioning same around the bead ring. Consequently, the next curing cycle takes place without the upper bead of the tire being properly positioned, and the resulting vulcanized tire is defective or cannot be used safely, and must therefore be rejected.

The same inconvenience is also observed with other conventional curing presses not equipped with the above-mentioned segments and wherein the upper bead ring is secured to the upper portion of the mold in the press. In fact, in these other types of conventional presses the upper portion of the mold is simply lowered upon the crude tire laid beforehand upon the lower portion of the mold and, since the upper bead of the crude tire is generally out of centre in relation to the vertical axis of symmetry of the mold it cannot position itself automatically around the bead ring during the downward movement of the upper mold portion. Then, when the vulcanizing bladder is introduced and inflated within the crude tire, said bladder will push the upper portion of the crude tire against the wall of the upper mold portion without the upper bead of the tire being properly positioned. As a result, a certain permanent distortion of the tire frequently occurs which, upon completion of the vulcanization operation proper, constitutes a major inconvenience.

SUMMARY OF THE INVENTION

It is the principle object of the present invention to avoid this inconvenience by providing a novel device for centering and positioning the upper bead of a horizontally disposed crude tire around the bead ring provided centrally of the upper, vertically movable mold portion of a curing press of the above mentioned type.

To this end, the invention provides a device for carrying out a method of centering and positioning the upper bead of a horizontally disposed crude tire around a bead ring provided centrally of a vertically movable upper portion of a mold in a vulcanizing press of the type comprising a plurality of regularly angularly spaced segments disposed in a cavity centrally of the upper mold portion, each segment being movable both vertically and radially under control of an actuator common to all said segments, and an inflatable vulcanization bladder disposed centrally of a lower fixed portion of the mold, characterized in that it comprises the steps of depositing a crude tire upon the lower mold portion, lowering the upper mold portion down to a predetermined distance from said lower mold portion, lowering and spreading radially said segments by actuating said cylinder, introducing said bladder into the tire cavity and inflating said bladder with a moderate pressure so as to push the upper bead of the tire against the ends of said spread segments, said segment ends being shaped to constitute together a tapered centering surface capable of centering the upper bead of the tire during said inflation step, and continuing the inflation of said bladder while allowing said segments to retract radially and rise under the influence of said bladder, until said upper bead is force fitted properly around the bead ring.

The invention also provides a device for carrying out the above-described method in a vulcanizing press of the type mentioned in the foregoing, characterised in that said segment have their ends or operative portions so shaped to constitute a tapered centering member tapering downwards and having its axis coincident with the vertical axis of symmetry of the mold.

With this arrangement, any distortion of the crude tire and any out of center of the upper bead are corrected automatically as a consequence of the specific configuration of the segments, in combination with the action exerted by the inflation of the vulcanization bladder which, after the centering of said bead by the segment ends, causes said bead to be properly positioned around said bead ring.

BRIEF DESCRIPTION OF THE DRAWINGS

Now a detailed description of this invention will be given with references to the attached drawings, in which:

FIG. 4 - 6 are views similar to FIGS. 1 -3, showing the manner in which the upper bead centering and positioning device of the invention may also be utilized for stripping the cured tired from the mold.

DESCRIPTION OF THE PREFERRED EMBODIMENT

Figure 1:
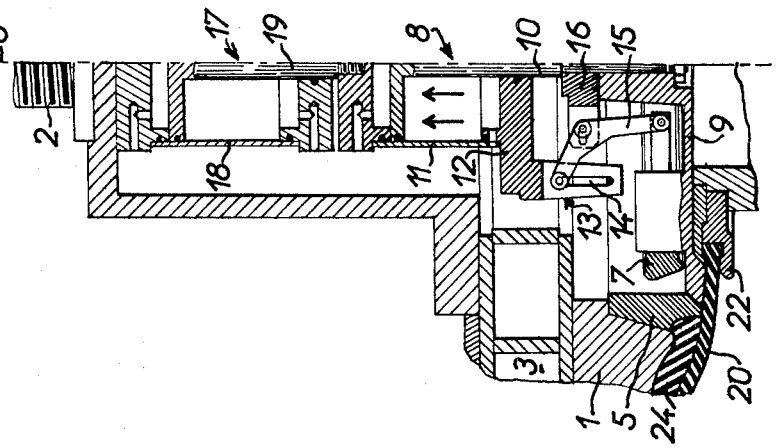
FIG. 1 - 3 are fragmentary views showing vertical sections of one half of the upper portion of a tire curing press, the sections containing the vertical axis of symmetry of the press and illustrating various steps of the method for centering and positioning the upper bead of a crude tire in the upper portion of the mold of the press.
Figure 2:
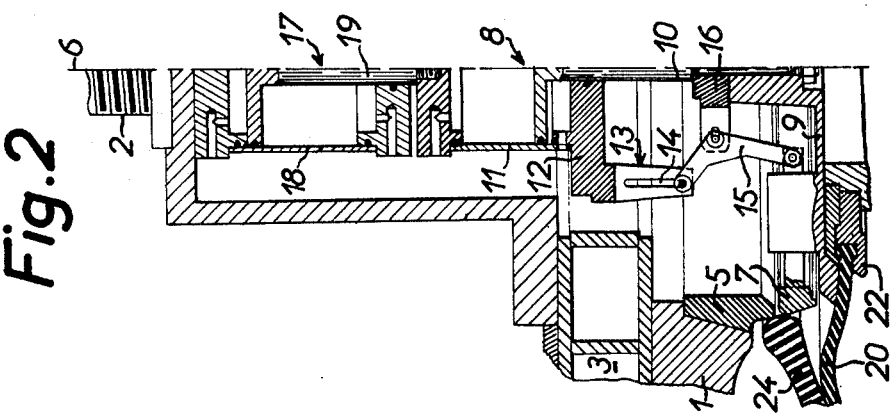
Figure 3:
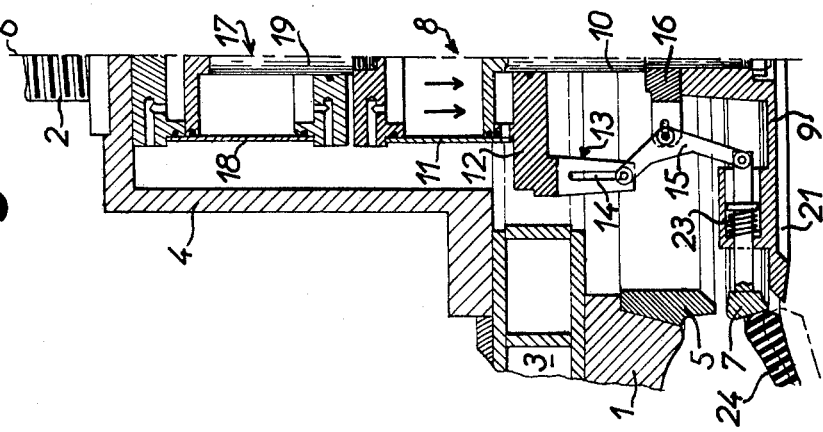

The vulcanization press illustrated in fragmentary sectional views in FIGS. 1 - 3 of the drawings comprises a mold of which the upper portion 1 is adapted to be moved vertically in relation to the fixed lower portion (not shown) by means of a suitable control system. This control system may comprise for example screw and ball-nut device of which only one portion of the screw 2 is illustrated. A control system of this type is disclosed in the above-mentioned British patent No. 1,368,362, to which reference may be made for a more detailed description. Of course, other means for controlling the vertical movements of the upper portion 1 of the press mold may be used, for instance those disclosed in German Patent No. 1,951,604 and in British Patent No. 1,207,881.

A hollow heating plate 3 in which steam is circulated is secured to the upper portion 1 of the mold. However, this hollow plate 3 may be dispensed with, since certain press types do not comprise this component. The assembly comprising the upper portion 1 of the mold and the hollow plate 3 is secured to the lower end of a bell-shaped member 4 fastened in turn to the bottom end of the screw 2. The bead ring 5 is disposed centrally of the upper portion 1 of the mold and secured to this portion. All the above-described components are of revolution about the vertical axis of symmetry 6 of the press.

Within the cavity provided centrally of the upper mold portion 1 a set of segments 7, in this example six in number, are disposed and regularly angularly spaced about the axis 6. Each segment 7 extends along one portion of the circumference. According to the invention, the outer end face of each segment 7, as seen in vertical section, is inclined to the axis 6 so that all these end faces form together a tapered centering member or surface having its taper directed downwardly with the axis thereof merging with axis 6.

All the segments 7 are adapted to be moved simultaneously both vertically and radially under the control of a double-acting fluid-actuated cylinder or actuator 8 disposed coaxially to the axis 6. For this purpose, the segments are mounted for radial movement on the upper surface of a solid plate 9 secured to the bottom end of the piston rod 10 of actuator 8. At its lower end the cylinder 11 of actuator 8 has a ring-shaped member 12 formed with a plurality of substantially vertical cam elements 13 disposed at regularly spaced intervals about axis 6. Each cam element 13 may consist for example of a vertical rectilinear slot 14 formed in a depending extension of said ring-shaped member 12 and shorter than the stroke of the piston rod 10 of actuator 8. A plurality of bell-crank levers 15 also disposed at regularly spaced angular intervals about axis 6 are also provided for controlling the radial movements of segments 7. Each bell-crank lever 15 is fulcrumed at its lower end to a corresponding segment 7 and at its elbow to a member 16 secured to the piston rod 10 of actuator 8, and in addition said bell-crank lever carries at its upper end a stud slidably engaging said slot 14 of a corresponding cam elments 13.

Another double-acting actuator 17 is disposed in a manner known per se within the bell-shaped member 4, coaxially to actuator 8 and axis 6. The cylinder 18 of actuator 17 is secured at its upper end to the bell-shaped member 4, and the cylinder 11 of actuator 8 is secured at its upper end to the lower end of the piston rod 19 of actuator 17. The stroke of piston rod 19 is selected to be longer than the vertical distance between the upper and lower beads of the tires to be vulcanized in the press.

The press further comprises also in a manner known per se an inflatable vulcanizing bladder 20 for example of the type described in Applicant's U.S. Pat. No. 3,837,770. Only one portion of this bladder is shown in FIGS. 2 and 3. It is disposed centrally of the lower portion (not shown) of the mold. In its bottom face the plate 9 comprises means for centering the vulcanizing bladder 20 in relation to the upper portion 1 of the mold. In the embodiment illustrated in the drawing, said centering means may comprise a recess 21 (FIG. 1) having a tapered lateral or peripheral wall, the axis of which merges with the vertical axis of symmetry 6 of the upper mold portion 1. As illustrated in FIGS. 2 and 3, said recess 21 is adapted to receive the bladder fixing head 22, which has a peripheral tapered wall complementary of that of said recess 21.

Now the manner in which the bead centering and positioning method may be carried out in actual practice by using the above-described device will be described in detail. A crude or uncured tire is firstly laid in a conventional manner upon the lower mold portion. This operation may be performed for example by using the automatic loader disclosed in the U.S. Pat. No. 3,809,423, if the press is equipped with this loader. In this case, the loader may also be used for centering and positioning the lower bead of the crude tire around the bead ring provided centrally of said lower mold portion. If the press comprises a different yet conventional type of loader no designed for centering and positioning the lower bead of the crude tire, this centering and positioning operation may advantageously be carried out by using the device disclosed in the U.S. Pat. No. 3,794,457.

Then, the upper mold portion 1 is lowered to a predetermined distance from the lower mold portion, for example by means of the screw 2. The actuator 8 is subsequently actuated for lowering its piston rod 10. As long as the stud carried by the upper end of each bell-crank lever 15 has not reached the lower end of slot 14, the segments 7 are lowered vertically together with the plate 9, whereafter, when said stud engages the lower end of the corresponding slot 14, the bell-crank levers 15 cause the segments 7 to be spread radially against the force of return springs 23 (shown only in FIG. 1). When the segments 7 have been spread completely in the radial direction at a level located just below the bead ring 5, but above the upper bead 24 of the crude tire as illustrated in FIG. 1, the vulcanizing bladder 20 is inserted in a manner known per se into the cavity of the crude tire and inflated with a moderate pressure so that said bladder will push upwards the upper bead 24 of the crude tire against the ends of segments 7 (FIG. 1). Since these ends are shaped to constitute together a tapered centering surface, they centre automatically the upper bead 24 during said inflation step. Then, as illustrated in FIG. 2, the supply of fluid under pressure to actuator 8 is discontinued and the inflation of bladder 20 is continued. Thus, the slightly inflated vulcanizing bladder 20 will exert an upward thrust directly against the plate 9, the latter then becoming a driving element for the mechanism. The upward movement of plate 9 causes the segments 7 to rise gradually and also to be retracted radially inwards within the central cavity of the upper mold portion 1 while the upper bead 24 of the tire is force fitted by the bladder 20 in the proper position around the bead ring 5, as shown in FIG. 3. Thereafter, the mold can be closed completely, if this has not been done before, and the vulcanization step can take place in the conventional manner.

The above-described device may also advantageously be used, upon completion of the vulcanization step, for stripping the cured tire without resorting to conventional stripping bars. For this purpose, after the vulcanizing bladder 20 has been retracted within a central cavity provided in the lower mold portion, the actuator 8 is again actuated for extracting its piston rod 10. As a result, the segments 7 are spread radially and brought to the position shown in FIG. 4. Then, the upper mold portion 1 is lifted by actuating the screw 2. During this movement of the upper mold portion 1, the upper bead 24 of the freshly cured tire is held in position around the bead ring 5 by the segments 7, so that the vulcanized tire is raised simultaneously as the upper mold portion 1 and its lower bead 25 is stripped from the bead ring 26 provided centrally of the lower fixed mold portion 27, as illustrated in FIG. 4. When the upper mold portion 1 has been raised by the screw 2 to a predetermined level above the lower mold portion 27, the double-acting actuator 17 is actuated in order to extract its piston rod 19 while the other actuator 8 is kept under fluid pressure for maintaining the segments 7 in their spread out position. The actuation of actuator 17 causes the set of segments 7 to bear against the lower bead 25 and thus cause the upper bead 24 to be positively separated from bead ring 5. as illustrated in FIG. 5. Then, both actuators 8 and 17 are actuated in the opposite direction to withdraw their piston rods 10 and 19, respectively, thus retracting the segments 7 as illustrated in FIG. 6, and allowing the tire to fall upon suitable discharge means, for example a conveyor (not shown).

Of course, the above-described embodiment of the invention is given by way of example, not of limitation, since many modifications may be brought thereto without departing from the basic principles of the invention. Thus, notably, although the present invention has been described hereinabove with reference to a vulcanizing press of the type disclosed in the British Pat. No. 1,368,362, it is also applicable to other types of vulcanizing presses, for example the one disclosed in the U.S. Pat. No. 3,936,251. In this case, instead of being secured to the bottom end of the screw 2, the bell-shaped member 4 may be secured to the overhanging cross member of the press described in said U.S. Pat.

I claim:

1. Device for centering and positioning the upper bead of a horizontally disposed crude tire around a bead ring disposed centrally of a vertically movable upper portion of a mold in a vulcanizing press of the type comprising a set of segments regularly angularly disposed around a vertical axis of symmetry of the mold in a central cavity in the upper mold portion, each segment being movable both vertically and radially under control of an actuator common to all the segments of the set, and an inflatable vulcanizing bladder disposed centrally of a lower fixed portion of the mold wherein said segments have their outer ends shaped to form a tapered centering surface having a taper directed downwardly and radially inwardly with its axis merging with the vertical axis of symmetry of the mold, said actuator having a place connected thereto to extend radially of the axis of symmetry with said segments mounted thereon and located in a first position to be remotely below said bead ring and in abutment with an outer edge of the upper bead of the crude tire, said segments being movable to a second position by the vertical movement to be closely adjacent and below said bead ring to cooperate with said bladder for guiding the upper bead around said bead ring.

2. Device according to claim 1, wherein said segments are mounted for radial movement on a top surface of said plate, said actuator includes a cylinder and piston rod extending downwardly therefrom with a predetermined stroke, said plate is solid and and secured to the lower end of said piston rod a ring-shaped member is rigidly mounted on said cylinder and is formed with a plurality of vertical cam elements extending downwardly therefrom, and a plurality of bell-crank levers corresponding in number to said cam elements and each having an elbow, each bell-crank lever being pivotally mounted at its lower end to a respective segment, having its elbow of said actuator secured to the piston rod of said actuator, and pivotally connected at its upper end with a corresponding cam element.

3. Device according to claim 2, wherein each cam element includes a rectilinear slot formed therein and having a length shorter than the stroke of said actuator piston rod, and each bell-crank lever carries at its upper end a stud slidably engaged in said slot.

4. Device according to claim 2, wherein said plate comprises on its bottom surface for centering said vulcanizing bladder in relation to the upper mold portion.

5. Device according to claim 4, wherein said centering means comprises a recess having a tapered lateral wall and an axis merging with the vertical axis of symmetry of said mold.

6. Device according to claim 1, further comprising another actuator disposed coaxially to said first actuator in the cental cavity of the upper mould portion and operatively connected therewith to move vertically said first actuator and said set of segments.

* * * * *